United States Patent
Gu et al.

(10) Patent No.: US 12,472,453 B2
(45) Date of Patent: Nov. 18, 2025

(54) GAS LIQUID SEPARATION DEVICE

(71) Applicant: Atlas Copco (Wuxi) Compressor Co., Ltd., Jiangsu (CN)

(72) Inventors: Chengdong Gu, Jiangsu (CN); Mathias Verstraete, Jiangsu (CN)

(73) Assignee: Atlas Copco (Wuxi) Compressor Co., Ltd., Jiangsu (CN)

( * ) Notice: Subject to any disclaimer, the term of this patent is extended or adjusted under 35 U.S.C. 154(b) by 347 days.

(21) Appl. No.: 18/036,180

(22) PCT Filed: Nov. 5, 2021

(86) PCT No.: PCT/CN2021/128946
§ 371 (c)(1),
(2) Date: May 10, 2023

(87) PCT Pub. No.: WO2022/100521
PCT Pub. Date: May 19, 2022

(65) Prior Publication Data
US 2023/0405503 A1 Dec. 21, 2023

(30) Foreign Application Priority Data
Nov. 13, 2020 (CN) .......................... 202022634927.4

(51) Int. Cl.
*B01D 46/00* (2022.01)
*B01D 46/24* (2006.01)

(52) U.S. Cl.
CPC ..... *B01D 46/0039* (2013.01); *B01D 46/0031* (2013.01); *B01D 46/2403* (2013.01); *B01D 2265/029* (2013.01); *B01D 2271/022* (2013.01)

(58) Field of Classification Search
CPC .............. B01D 46/003; B01D 46/0031; B01D 46/2403; B01D 46/0039; B01D 2265/029; B01D 2271/022
See application file for complete search history.

(56) References Cited

U.S. PATENT DOCUMENTS 4,632,682 A * 12/1986 Erdmannsdorfer .......................... B01D 46/2414
55/504
2010/0000412 A1 1/2010 Heikamp
(Continued)

FOREIGN PATENT DOCUMENTS

CN 102149443 A 8/2011
CN 103717286 A 4/2014
(Continued)

OTHER PUBLICATIONS

International Search Report in corresponding PCT Application No. PCT/CN2021/128946, dated Jan. 31, 2022.
(Continued)

*Primary Examiner* — Robert Clemente
(74) *Attorney, Agent, or Firm* — BACON & THOMAS, PLLC

(57) ABSTRACT

A gas-liquid separation device includes a housing assembly, a separation assembly, a bottom end plate, an exhaust pipe, and a seal. A separation chamber is defined in the housing assembly. A bottom of the housing assembly has a through-opening. The separation assembly performs gas-liquid separation on a gas-liquid mixture. The bottom end plate is located at a bottom of the separation assembly. A liquid reservoir is defined by the bottom end plate and receives a liquid separated by the separation assembly. The exhaust pipe has an exhaust channel and a liquid discharge channel. The exhaust pipe passes through the through-opening to allow a gas separated by the separation assembly to flow through the exhaust channel. A flow diversion cavity is defined between the exhaust pipe and the bottom end plate, and is in communication with an outlet of the liquid reservoir and an inlet of the liquid discharge channel.

14 Claims, 7 Drawing Sheets

(56) References Cited

U.S. PATENT DOCUMENTS

| | | | | |
|---|---|---|---|---|
| 2015/0101293 A1* | 4/2015 | Dworatzek | ............ | B01D 46/24 |
| | | | | 55/423 |
| 2016/0030870 A1* | 2/2016 | Schmelzle | ......... | B01D 46/0031 |
| | | | | 285/119 |
| 2018/0104632 A1* | 4/2018 | Schmelzle | ......... | B01D 46/2411 |
| 2018/0243676 A1* | 8/2018 | Bartelt | ............. | B01D 46/2411 |
| 2024/0131461 A1* | 4/2024 | Dworatzek | ........ | B01D 46/0031 |

FOREIGN PATENT DOCUMENTS

| | | | | |
|---|---|---|---|---|
| CN | 107636297 A | | 1/2018 | |
| CN | 214209765 U | | 9/2021 | |
| DE | 102007033919 A1 * | 11/2008 | ......... | B01D 46/0031 |
| DE | 102014000281 A1 * | 8/2014 | ............. | B01D 46/24 |
| DE | 102016009487 A1 * | 2/2018 | ......... | B01D 46/2411 |
| WO | WO2023280517 A1 | | 1/2023 | |

OTHER PUBLICATIONS

Written Opinion in corresponding PCT Application No. PCT/CN2021/128946, dated Jan. 30, 2022.
Supplementary European Search Report cited in corresponding Appln. No. EP21891047 dated Jul. 10, 2024.
PCT Search Report cited in corresponding Appln. No. PCT/CN2021/128946.

* cited by examiner

GAS LIQUID SEPARATION DEVICE

CROSS-REFERENCE TO RELATED APPLICATION

The present application is based on and claims priority to Chinese Patent Application No. 202022634927.4, filed on Nov. 13, 2020, the entire disclosure of which is incorporated herein by reference.

FIELD OF THE INVENTION

The present disclosure relates to the field of gas-liquid separation technologies, and more particularly, to a gas-liquid separation device.

BACKGROUND OF THE INVENTION

For a gas-liquid separation device in the related art, a gap for discharging oil is reserved at a fitting position between the exhaust pipe and the housing to allow separated oil to be discharged through the gap. Due to the arrangement of the gap, assembly reliability between the exhaust pipe and the housing is poor. In addition, such an oil discharge mode requires a long oil discharge path, and many parts needs to be sealed.

SUMMARY OF THE INVENTION

The present disclosure aims to solve at least one of the technical problems in prior art. To this end, the present disclosure proposes a gas-liquid separation device, which is capable of ensuring assembly reliability between the exhaust pipe and the housing assembly, simplifying and shortening the liquid discharge path, and reducing positions requiring to be sealed.

A gas-liquid separation device according to an embodiment of the present disclosure includes a housing assembly, a separation assembly, a bottom end plate, and an exhaust pipe. A separation chamber is defined in the housing assembly. The housing assembly has a gas inlet in communication with the separation chamber, and the bottom of the housing assembly has a through-opening. The separation assembly is disposed in the separation chamber and used to perform gas-liquid separation on the gas-liquid mixture entering the separation chamber. The bottom end plate is disposed in the separation chamber and located at the bottom of the separation assembly. A liquid reservoir is defined by the bottom end plate and used to receive liquid separated by the separation assembly. The exhaust pipe has an exhaust channel and a liquid discharge channel. The exhaust pipe passes through the through-opening to allow gas separated by the separation assembly to flow through the exhaust channel. A flow diversion cavity is defined between the exhaust pipe and the bottom end plate. The flow diversion cavity is in communication with the outlet of the liquid reservoir and the inlet of the liquid discharge channel to configure the gas-liquid separation device in such a manner that the liquid flowing out of the outlet of the liquid reservoir enters the flow diversion cavity, and the liquid flowing out of the flow diversion cavity directly enters the inlet of the liquid discharge channel.

With the gas-liquid separation device according to the embodiment of the present disclosure, it is possible to ensure assembly reliability between the exhaust pipe and the housing assembly, simplify and shorten the liquid discharge path, and reduce parts to be sealed.

In some embodiments, both the inlet of the liquid discharge channel and the outlet of the liquid reservoir are located at a higher level than the upper end of the through-opening. The flow diversion cavity is located above the through-opening. The gas-liquid separation device further includes a first seal located at a level lower than the outlet of the liquid reservoir and higher than the through-opening. The first seal is sandwiched between the bottom end plate and the exhaust pipe, or sandwiched between the housing assembly and the exhaust pipe, or sandwiched between the bottom end plate, the housing assembly, and the exhaust pipe, to isolate the flow diversion cavity from the through-opening.

In some embodiments, the bottom end plate has a center hole at a center thereof, and a liquid collection groove is formed around the center hole on the bottom end plate. The liquid collection groove constitutes as at least part of the liquid reservoir. The liquid collection groove has an outer wall adjacent to the center hole. The outer wall has a liquid through hole serves as the outlet of the liquid reservoir and is in communication with the flow diversion cavity. The exhaust pipe passes through the center hole. The center hole is located at a higher level than the liquid through hole and abutted against the exhaust pipe.

In some embodiments, the exhaust pipe includes an inner pipe and a pipe joint. The inner pipe is located within the housing assembly and has a lower end abutted against and fixedly connected to the center hole. The pipe joint has a lower end located outside the housing assembly and an upper end extending into the housing assembly through the through-opening and engaged with the inner pipe, so that the exhaust channel is defined by the inner pipe and the pipe joint. The liquid discharge channel is formed on the pipe joint. The pipe joint is detachably connected to the housing assembly. The upper end of the pipe joint extends into the lower end of the inner pipe. The lower end of the inner pipe has a greater inner diameter than the outer diameter of the upper end of the pipe joint.

In some embodiments, the gas-liquid separation device further includes a second seal, the second seal located at a higher level than the liquid through hole and located between the outer wall of the liquid collection groove and an outer peripheral wall of the pipe joint, to isolate the insertion-engagement gap between the flow diversion cavity with the inner pipe and the pipe joint, the inner pipe has a greater average inner diameter than the pipe joint.

In some embodiments, a lug boss is disposed on an outer peripheral wall of the lower end of the inner pipe. The part of the inner pipe located below the lug boss is a bottom end portion, the outer diameter of the bottom end portion tapers from top to bottom. The bottom end plate is sleeved outside the bottom end portion by means of the center hole and blocked at a position below the lug boss.

In some embodiments, the upper end of the pipe joint is inserted into the lower end of the inner pipe. The outer peripheral surface of the upper end of the pipe joint is in a clearance fit with the inner peripheral surface of the lower end of the inner pipe. The inner peripheral surface of the lug boss has at least one sealing groove.

In some embodiments, at least one sealing groove is formed on at least one of the inner peripheral surface of the lower end of the inner pipe and the outer peripheral surface of the upper end of the pipe joint. The at least one sealing groove is located at the insertion-engagement position between the inner pipe and the pipe joint.

In some embodiments, the inner pipe is welded to the bottom end plate.

In some embodiments, the outer peripheral wall of the pipe joint has external threads. The through-opening has internal threads. The pipe joint is threadedly engaged with the through-opening by the external threads and the internal threads.

In some embodiments, the outer peripheral wall of the exhaust pipe has a shoulder passing through the through-opening. The liquid discharge channel extends in an up-down direction. The liquid discharge channel has a lower end penetrating the shoulder, and an upper end penetrating the shoulder and extending into the flow diversion cavity to form the inlet of the liquid discharge channel.

In some embodiments, the outer peripheral wall of the exhaust pipe has a shoulder passing through the through-opening. The liquid discharge channel extends in an up-down direction and has a lower end penetrating the shoulder. A side opening is formed on the side wall of the shoulder. The side opening extends into and is in communication with the flow diversion cavity, and the side opening also extends into and is in communication with the liquid discharge channel to serve as the inlet of the liquid discharge channel. The upper end of the liquid discharge channel penetrates the shoulder and a sealing member is disposed at the upper end of the liquid discharge channel.

In some embodiments, the exhaust pipe includes an inner pipe and a pipe joint. The inner pipe is located within the housing assembly and has a lower end fixedly connected to the bottom end plate. The pipe joint has a lower end located outside the housing assembly and an upper end extending into the housing assembly through the through-opening and engaged with the lower end of the inner pipe, so that the exhaust channel is defined by the inner pipe and the pipe joint. The liquid discharge channel is formed on the pipe joint. The pipe joint is detachably connected to the housing assembly. The flow diversion cavity is formed between the inner pipe, the pipe joint, and the bottom end plate, or between the pipe joint and the bottom end plate.

In some embodiments, the housing assembly includes a housing and a bottom cover. The housing has an open bottom. The bottom cover is disposed at the bottom of the housing. Both the gas inlet and the through-opening are formed on the bottom cover. The separation assembly is of a cylindrical shape and vertically disposed in the separation chamber. The gas-liquid separation device further includes a top end plate and a pressing member. The top end plate is disposed at a top of the separation assembly. The pressing member is disposed between the top end plate and the top wall of the housing to provide a downward pressing force to the separation assembly. Each of the through-opening, the liquid discharge channel, and the exhaust channel extends in an up-down direction. The through-opening is arranged around the liquid discharge channel, and the liquid discharge channel is arranged around the exhaust channel.

Additional aspects and advantages of the present disclosure will be provided at least in part in the following description, or will become apparent at least in part from the following description, or can be learned from practicing of the present disclosure.

Figure 1:
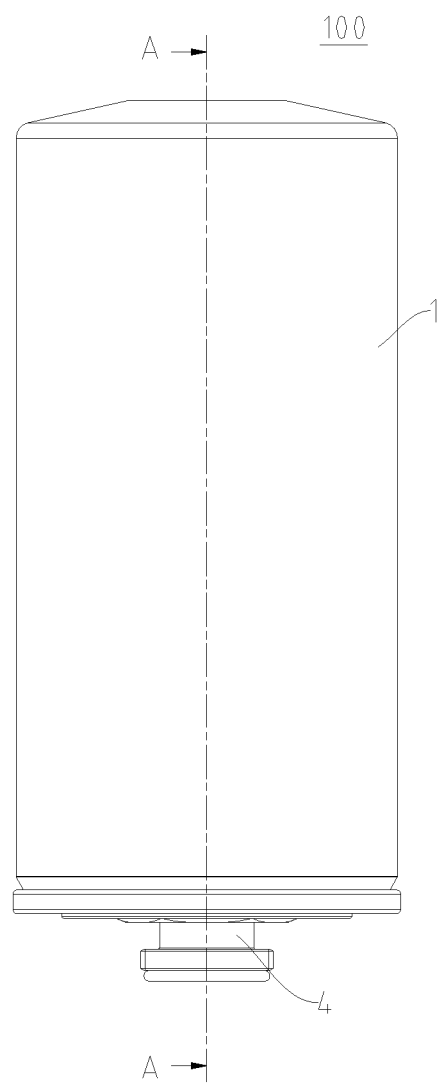
FIG. 1 is a schematic view of a gas-liquid separation device according to an embodiment of the present disclosure.

Reference numerals of the accompanying drawings:
gas-liquid separation device 100;
housing assembly 1; housing 11; separation chamber 111; bottom cover 12; gas inlet 121; through-opening 122;
separation assembly 2; first-stage separation medium 21; second-stage separation medium 22; support member 23;
bottom end plate 3; liquid reservoir 301; center hole 302; liquid collection groove 303;
outer wall 31; liquid through hole 311; mounting bracket 32;
exhaust pipe 4; exhaust channel 401; liquid discharge channel 402; side opening 403;
inner pipe 41; lug boss 411; bottom end portion 412; sealing groove 4110; pipe joint 42;
shoulder 4a;
first seal 5A; second seal 5B; sealing member 5C;
top end plate 6; pressing member 7;
first sealing ring 81; second sealing ring 82; damping ring 9;
flow diversion cavity 101; body 102; cavity 103;
valve seat 200; gas channel 201; liquid channel 202

DETAILED DESCRIPTION OF THE INVENTION

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A number of embodiments or examples are provided in the disclosure described below to implement different structures of the present disclosure. To simplify the disclosure of the present disclosure, components and arrangements of particular examples will be described below, which are, of course, examples only and are not intended to limit the present disclosure. Furthermore, reference numerals and/or reference letters may be repeated in different examples of the present disclosure. Such repetition is for the purpose of simplicity and clarity and does not indicate any relationship between various embodiments and/or arrangements in question. In addition, various examples of specific processes and materials are provided in the present disclosure. However, those of ordinary skill in the art may be aware of applicability of other processes and/or the use of other materials.

A gas-liquid separation device 100 according to an embodiment of the present disclosure will be described below with reference to the accompanying drawings.

Figure 2:
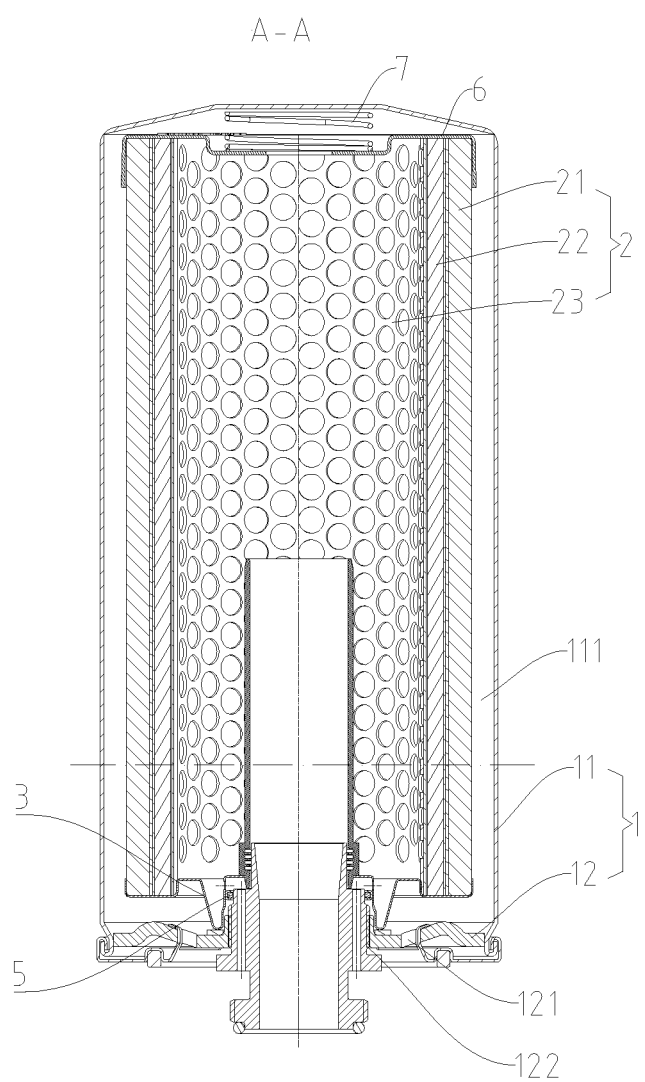
FIG. 2 is a cross-sectional view taken along line A-A in FIG. 1.

As illustrated in FIG. 1 and FIG. 2, the gas-liquid separation device 100 may include a housing assembly 1, a separation assembly 2, a bottom end plate 3, and an exhaust pipe 4. A separation chamber 111 is defined in the housing assembly 1. The housing assembly 1 has a gas inlet 121 in communication with the separation chamber 111, and thus a gas-liquid mixture and the like can enter the separation chamber 111 through the gas inlet 121. The separation assembly 2 is disposed in the separation chamber 111 and configured to perform gas-liquid separation on the gas-liquid mixture entering the separation chamber 111. It should be noted that a structural shape of the housing assembly 1 is not limited and may be, for example, cylindrical, square cylindrical, polygonal cylindrical, special-shaped, or the like. The position where the gas inlet 121 is formed is not limited, and the gas inlet 121 may be formed on a side wall, a top wall of the housing assembly 1, or the like.

Figure 3:
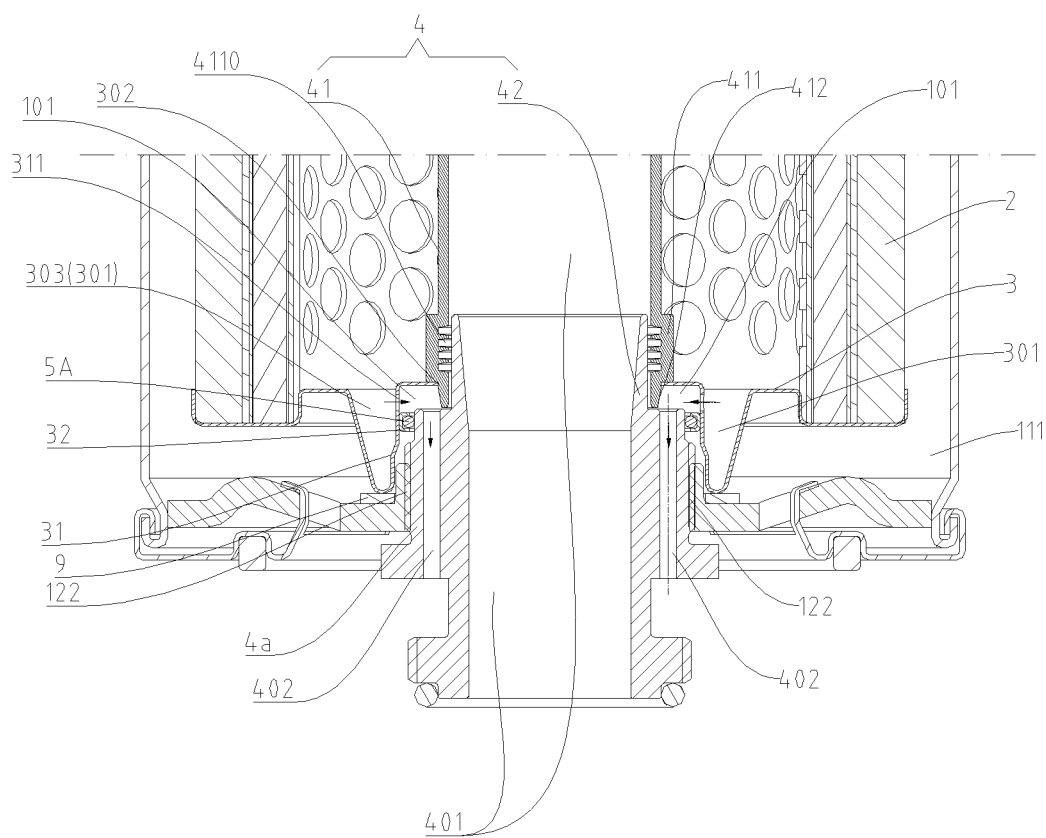
FIG. 3 is an enlarged partial view of FIG. 2.

As illustrated in FIG. 2 and FIG. 3, the bottom end plate 3 is disposed in the separation chamber 111, and is located at the bottom of the separation assembly 2. A liquid reservoir 301 for receiving the liquid separated by the separation assembly 2 is defined by the bottom end plate 3. It should be understood that the separation assembly 2 is configured to perform the gas-liquid separation on the gas-liquid mixture. After filtered out by the separation assembly 2, the liquid in the gas-liquid mixture, such as the oil liquid, drips along the separation assembly 2 due to gravity to fall into the liquid reservoir 301 defined by the bottom end plate 3. It should be noted that the shape of each of the bottom end plate 3 and the liquid reservoir 301 are not limited, as long as the liquid dripping along the separation assembly 2 can be received and collected by the bottom end plate 3 and the liquid reservoir 301.

As illustrated in FIG. 2 and FIG. 3, the exhaust pipe 4 has an exhaust channel 401 and a liquid discharge channel 402. The gas entering the exhaust channel 401 will basically not flow into the liquid discharge channel 402, and the liquid entering the liquid discharge channel 402 will basically not flow into the exhaust channel 401. A through-opening 122 is defined on a bottom of the housing assembly 1. The exhaust pipe 4 passes through the through-opening 122 to allow a gas separated by the separation assembly 2 to flow along the exhaust channel 401. That is, only after flowing from an upstream to a downstream of the separation assembly 2, a gas in the gas-liquid mixture enters the exhaust channel 401, and then is discharged along the exhaust channel 401.

As illustrated in FIG. 2 and FIG. 3, a flow diversion cavity 101 is formed between the exhaust pipe 4 and the bottom end plate 3. The flow diversion cavity 101 is in communication with the outlet of the liquid reservoir 301 and the inlet of the liquid discharge channel 402. Thus, the gas-liquid separation device 100 can be configured such that the liquid flowing out of the outlet of the liquid reservoir 301 enters the flow diversion cavity 101, and the liquid flowing out of the flow diversion cavity 101 directly enters the inlet of the liquid discharge channel 402.

In this way, after the gas-liquid mixture enters the separation chamber 111 through the gas inlet 121, the liquid in the gas-liquid mixture can be separated by the separation assembly 2. The separated liquid drips along the separation assembly 2 due to the gravity, and then flows into the liquid reservoir 301 of the bottom end plate 3. Thereafter, the separated liquid enters the flow diversion cavity 101, and then is discharged through the liquid discharge channel 402 in the exhaust pipe 4. The gas in the gas-liquid mixture can pass through the separation assembly 2 and then be discharged through the exhaust channel 401 in the exhaust pipe 4. Therefore, the gas-liquid separation can be realized.

Thus, according to the gas-liquid separation device 100 of the embodiments of the present disclosure, since the liquid discharge channel 402 is disposed in the exhaust pipe 4, and the flow diversion cavity 101 is disposed between the exhaust pipe 4 and the bottom end plate 3, the liquid in the liquid reservoir 301 can overflow into the flow diversion cavity 101 first, and then directly enter the liquid discharge channel 402 from the flow diversion cavity 101, and finally be discharged therefrom. Therefore, it is possible to effectively simplify and shorten the liquid discharge path, and reduce parts to be sealed and the number of sealing elements. Thus, subassembly time is shortened, costs are lowered, and unnecessary storage positions in a production line and an unnecessary inventory can be cut down, thereby avoiding a problem of sealing failure caused by neglected mounting or damages of an individual one of the sealing elements, and improving reliability of the gas-liquid separation device 100.

Moreover, for some gas-liquid separation devices in the related art, since the liquid is usually discharged through a gap between the exhaust pipe and the through-opening, it is necessary to reserve a gap for discharging the oil at the exhaust pipe and the through-opening of the housing assembly, which leads to poor assembly reliability of the exhaust pipe and the housing assembly. Also, the liquid discharged through the gap between the exhaust pipe and the through-opening flows along the outer peripheral wall of the exhaust pipe, which is inconvenient to collect the liquid. However, for the gas-liquid separation device 100 of the embodiments of the present disclosure, the liquid separated from the gas-liquid mixture is not discharged from a fitting position between the exhaust pipe 4 and the housing assembly 1, i.e., the through-opening 122, which can ensure a fitting reliability of the exhaust pipe 4 and the housing assembly 1. In addition, it is unnecessary for the liquid discharged from the liquid discharge channel 402 to flow along the outer peripheral wall of the exhaust pipe 4, which facilitates the collection of discharged liquid.

In some embodiments of the present disclosure, as illustrated in FIG. 2 and FIG. 3, both the inlet of the liquid discharge channel 402 and the outlet of the liquid reservoir 301 are located at a higher level than the upper end of the through-opening 122, and the flow diversion cavity 101 is located above the through-opening 122. Therefore, it can be simply and effectively achieved that on the one hand the flow diversion cavity 101 is in direct communication with the outlet of the liquid reservoir 301, and on the other hand the flow diversion cavity 101 is in direct communication with the inlet of the liquid discharge channel 402. Therefore, the gas-liquid separation device 100 can be configured such that the liquid flowing out of the outlet of the liquid reservoir 301 directly enters the flow diversion cavity 101, and the liquid flowing out of the flow diversion cavity 101 directly enters the inlet of the liquid discharge channel 402.

Figure 7:
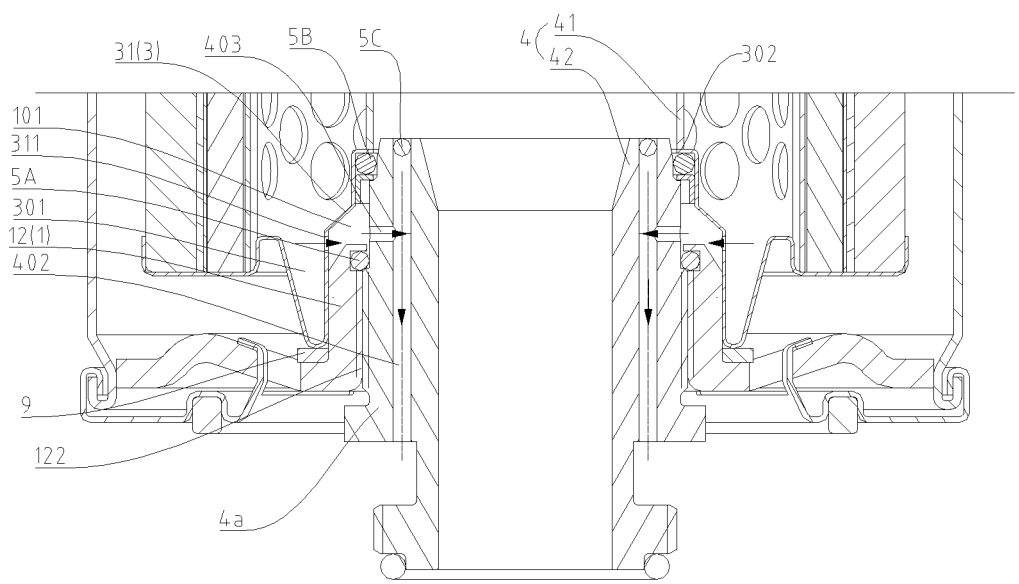
FIG. 7 is a cross-sectional view of a gas-liquid separation device according to another embodiment of the present disclosure.

As illustrated in FIG. 2 and FIG. 3, the gas-liquid separation device 100 further includes a first seal 5A located at a level lower than the outlet of the liquid reservoir 301 and higher than the through-opening 122. The first seal 5A is sandwiched between the bottom end plate 3 and the exhaust pipe 4 (e.g., as illustrated in FIG. 3), or sandwiched between the housing assembly 1 and the exhaust pipe 4 (e.g., as illustrated in FIG. 7), or sandwiched between the bottom end plate 3, the housing assembly 1, and the exhaust pipe 4, to isolate the flow diversion cavity 101 from the through-opening 122. Therefore, it is possible to prevent the liquid separated from the gas-liquid mixture from being discharged at the fitting position between the exhaust pipe 4 and the housing assembly 1, i.e., the through-opening 122, which allows more concentrated discharge of the liquid from the liquid discharge channel 402. Therefore, flow of the liquid along the outer peripheral wall of the exhaust pipe 4 can be avoided, thereby facilitating the collection of the discharged liquid.

Figure 8:
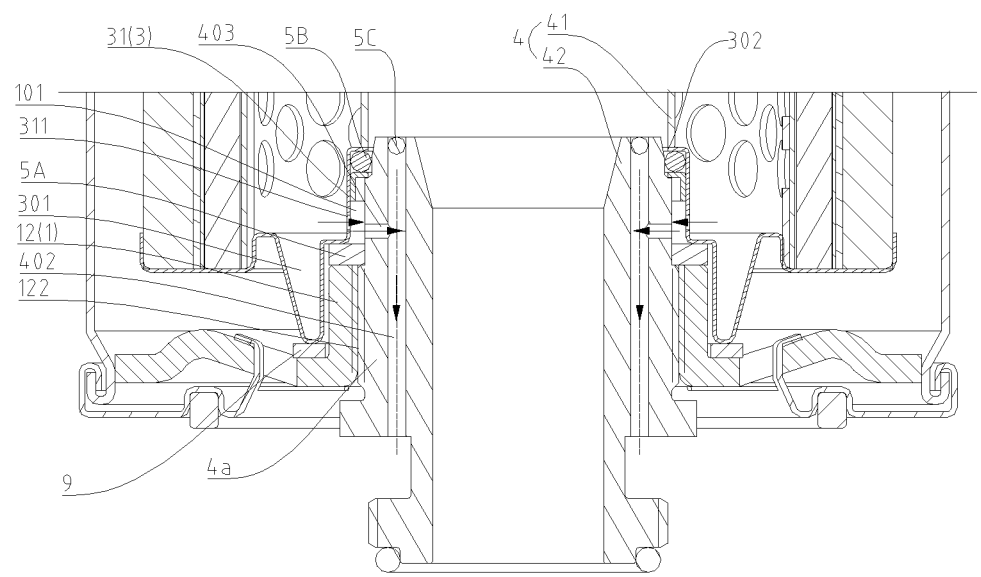
FIG. 8 is a cross-sectional view of a gas-liquid separation device according to yet another embodiment of the present disclosure.

In some embodiments of the present disclosure, as illustrated in FIG. 2 and FIG. 3, the exhaust pipe 4 includes an inner pipe 41 and a pipe joint 42. The inner pipe 41 is located within the housing assembly 1 and has a lower end fixedly connected to the bottom end plate 3. The pipe joint 42 has a lower end located outside the housing assembly 1, and an upper end extending into the housing assembly 1 through the through-opening 122 and engaged with the lower end of the inner pipe 41. In this way, the exhaust channel 401 is defined by the inner pipe 41 and the pipe joint 42. The liquid discharge channel 402 is formed on the pipe joint 42. The pipe joint 42 is detachably connected to the housing assembly 1. The flow diversion cavity 101 is formed between the inner pipe 41, the pipe joint 42, and the bottom end plate 3 (as illustrated in FIG. 3), or between the pipe joint 42 and the bottom end plate 3 (as illustrated in FIG. 7 and FIG. 8).

Figure 4:
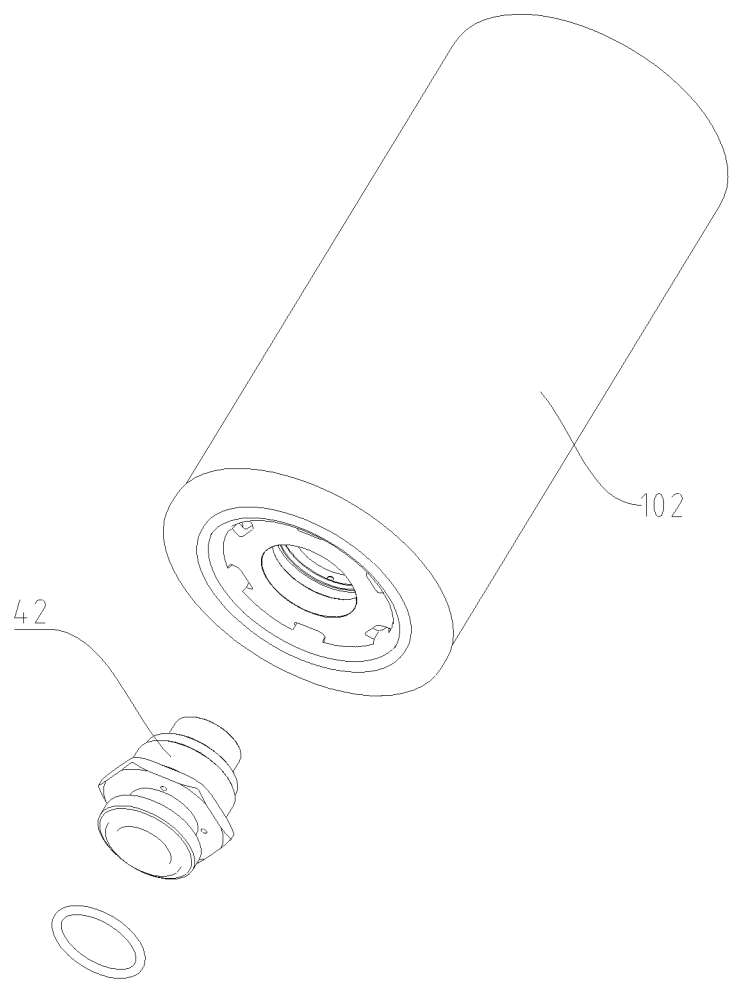
FIG. 4 is an exploded view of FIG. 1.
Figure 5:
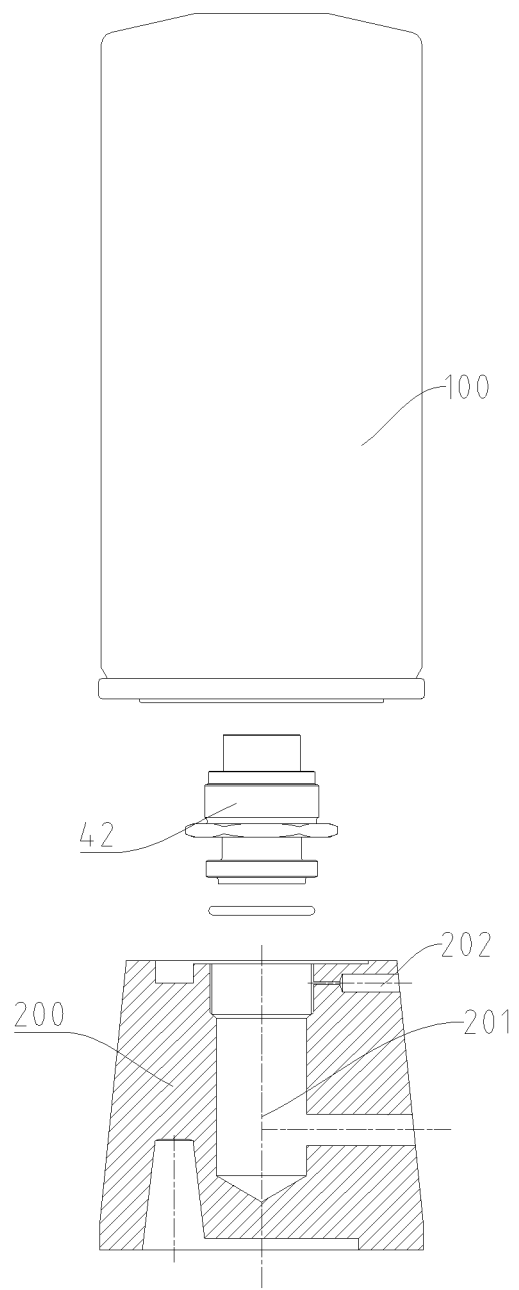
FIG. 5 is an exploded view of a gas-liquid separation device and a valve seat that are illustrated in FIG. 1
Figure 6:
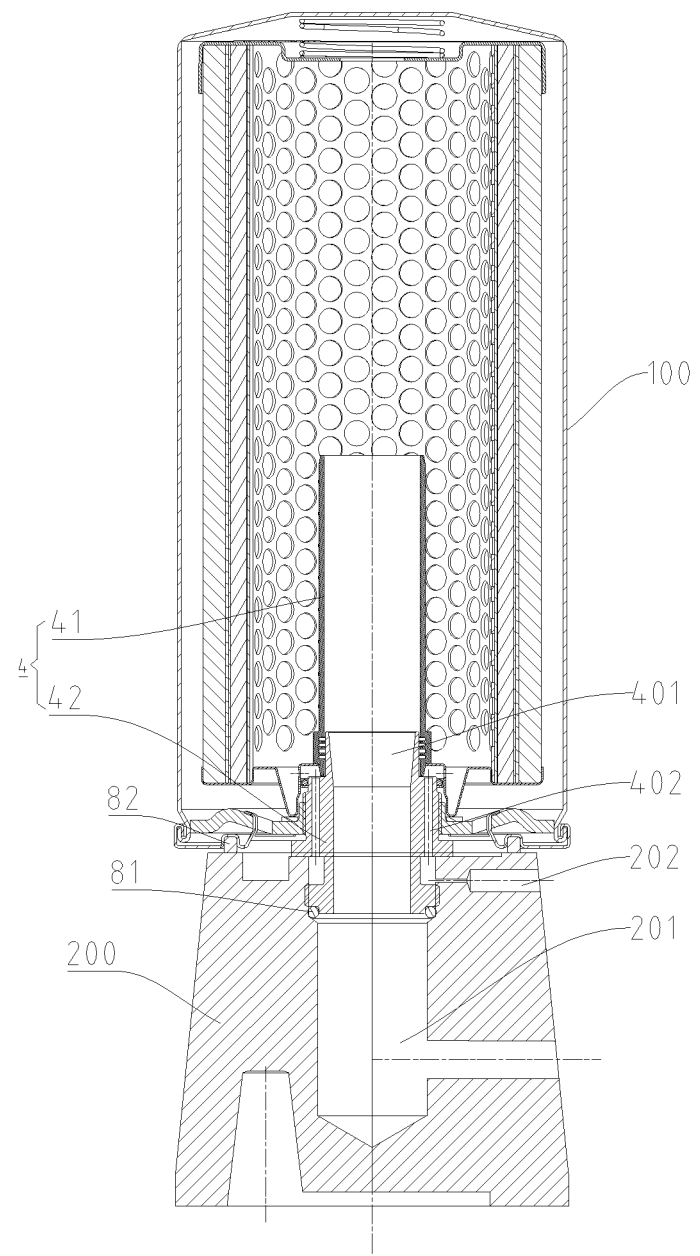
FIG. 6 is an assembled view of a gas-liquid separation device and a valve seat that are illustrated in FIG. 2

Therefore, the inner pipe 41 can be fixed in the housing assembly 1 by a fixed connection between the inner pipe 41 and the bottom end plate, and all remaining components in the housing assembly 1 are assembled in place to serve as a body 102 of the gas-liquid separation device (as illustrated in FIG. 4). When in use, the pipe joint 42 is first connected to an external device having a gas-liquid path (for example, as illustrated in FIG. 5 and FIG. 6, the external device may be a valve seat 200 that may have a gas channel 201 in communication with the exhaust channel 401, a liquid channel 202 in communication with the liquid discharge channel 402, or the like). Then, the pipe joint 42 is assembled with the body 102 to form the exhaust pipe 4 by the pipe joint 42 and the inner pipe 41, thereby enabling an operation of the gas-liquid separation device 100.

In this way, when the gas-liquid separation device 100 needs to be used, instead of the whole exhaust pipe 4, only the pipe joint 42 is assembled. Since the length of the pipe joint 42 is smaller than the length of the whole exhaust pipe 4, a manipulation space and manipulation amplitude during assembly can be reduced to facilitate quick assembly, which in turn makes it easy to mount the gas-liquid separation device 100 of the embodiments of the present disclosure.

It should be understood that if the inner pipe and the pipe joint are a crimped exhaust pipe or an integrated exhaust pipe, when the housing assembly needs to be assembled to the exhaust pipe, the lower end surface of the housing assembly needs to be lifted above the upper end of the exhaust pipe, which requires a large top manipulation space to be reserved. However, according to the gas-liquid separation device 100 of the embodiments of the present disclosure, with reference to FIG. 4 and FIG. 5, since the inner pipe 41 and the pipe joint 42 are separated members, only the lower end surface of the housing assembly 1 needs to be lifted above the upper end of the pipe joint 42 when the housing assembly 1 needs to be assembled to the pipe joint 42, and thus it is unnecessary to reserve the large top manipulation space, making the assembly much convenient. It should be understood that since the body 102 needs to be replaced after the gas-liquid separation device 100 is used for a period of time, designing the inner pipe 41 and the pipe joint 42 into separated members is conducive to disassembly and replacement of the body 102.

In some embodiments of the present disclosure, as illustrated in FIG. 2 and FIG. 3, a center hole 302 is formed at the center of the bottom end plate 3, and the bottom end plate 3 has a liquid collection groove 303 arranged around the center hole 302 and is formed as at least a part of the liquid reservoir 301. The liquid collection groove 303 has an outer wall 31 at the side adjacent to the center hole 302. The outer wall 31 has a liquid through hole 311. The liquid through hole 311 is formed as the outlet of the liquid reservoir 301 and in communication with the flow diversion cavity 101. The exhaust pipe 4 passes through the center hole 302. The center hole 302 is located at a higher level than the liquid through hole 311 and is abutted against the exhaust pipe 4 (e.g., the inner pipe 41 of the exhaust pipe 4 described later).

Therefore, after the liquid separated by the separation assembly 2 is collected in the liquid collection groove 303, the liquid can flow into the flow diversion cavity 101 through the liquid through hole 311 when reaching a lever equal to a height of the liquid through hole 311, rather than flowing beyond the height of the liquid through hole 311 and overflowing the center hole 302, thereby lowering the liquid discharge level in the bottom end plate 3. When the gas-liquid separation device 100 is used for gas-liquid separation of compressed gas, the oil content of the compressed gas can be reduced, and operating time of the gas-liquid separation device can be shortened.

Moreover, since the center hole 302 of the bottom end plate 3 is abutted against the exhaust pipe 4, on the one hand, the exhaust pipe 4 and the bottom end plate 3 can be limited on their positions relative to each other to improve stability of both the exhaust pipe 4 and the bottom end plate 3, and on the other hand, it is possible to prevent the gas flowing through the separation assembly 2 from leaking into the flow diversion cavity 101 through the gap between the center hole 302 and the exhaust pipe 4, thereby further improving reliability of the gas-liquid separation.

In some embodiments of the present disclosure, the liquid collection groove 303 may be an annular groove, which can better achieve flow collection and overflow towards the liquid through hole 311. Of course, the present disclosure is not limited in this regard. In other embodiments of the present disclosure, may be no liquid through hole 311 disposed on the bottom end plate 3, in which case the center hole 302 and the exhaust pipe 4 may be in a clearance fit for the liquid to overflow from the flow diversion cavity 101 through the clearance.

In some embodiments of the present disclosure, as illustrated in FIG. 2 and FIG. 3, the exhaust pipe 4 may include the inner pipe 41 and the pipe joint 42. The inner pipe 41 is located within the housing assembly 1. The lower end of the inner pipe 41 is abutted against and fixedly connected to the center hole 302 through, for example, welding, brazing, or a fastener. The lower end of the pipe joint 42 is located outside the housing assembly 1, and the upper end of the pipe joint 42 extends into the housing assembly 1 through the through-opening 122 and is engaged with the inner pipe 41. In this way, the exhaust channel 401 is defined by the inner pipe 41 and the pipe joint 42. The liquid discharge channel 402 is formed on the pipe joint 42. The pipe joint 42 is detachably connected to the housing assembly 1.

Therefore, the inner pipe 41 can be fixed in the housing assembly 1 by the fixed connection between the inner pipe 41 and the bottom end plate 3, and all remaining components in the housing assembly 1 are assembled in place to serve as the body 102 of the gas-liquid separation device (as illustrated in FIG. 4). When in use, the pipe joint 42 is first connected to the external device having the gas-liquid path (for example, as illustrated in FIG. 5 and FIG. 6, the external device may be the valve seat 200 that may have the gas channel 201 in communication with the exhaust channel 401, the liquid channel 202 in communication with the liquid discharge channel 402, or the like). Then, the pipe joint 42 is assembled with the body 102. In this way, the exhaust pipe 4 is formed by the pipe joint 42 and the inner pipe 41, thereby enabling the operation of the gas-liquid separation device 100.

In this way, when the gas-liquid separation device 100 needs to be used, instead of the whole exhaust pipe 4, only the pipe joint 42 is assembled. Since the length of the pipe joint 42 is smaller than the length of the whole exhaust pipe 4, a manipulation space and manipulation amplitude during assembly can be reduced to facilitate quick assembly, which in turn allows the gas-liquid separation device 100 of the embodiments of the present disclosure to be easily mounted.

It should be understood that if the inner pipe and the pipe joint are a crimped exhaust pipe or an integrated exhaust pipe, in a case where it is necessary to assembly the housing assembly to the exhaust pipe, the lower end surface of the housing assembly needs to be lifted above the upper end of the exhaust pipe, which requires a large top manipulation space to be reserved. However, according to the gas-liquid separation device 100 of the embodiments of the present disclosure, with reference to FIG. 4 and FIG. 5, since the inner pipe 41 and the pipe joint 42 are separate members, when assembling the housing assembly 1 to the pipe joint 42, only the lower end surface of the housing assembly 1 needs to be lifted above the upper end of the pipe joint 42 without reserving the large top manipulation space, which provides much convenient assembly. It should be understood that since the body 102 needs to be replaced after the gas-liquid separation device 100 is used for a period of time, designing the inner pipe 41 and the pipe joint 42 into the separate members is conducive to the disassembly and replacement of the body 102.

Of course, the present disclosure is not limited in this regard. In other embodiments of the present disclosure, the exhaust pipe may only include the pipe joint without the inner pipe. In this case, the upper end of the pipe joint may extend into the housing assembly 1 through the through-opening and be in a clearance fit with the wall of the center hole 30, details of which will be omitted herein. It should be noted that a fitting manner between the pipe joint 42 and the inner pipe 41 is not limited. For example, the pipe joint 42 may be directly inserted into the inner pipe 41 or indirectly connected to the inner pipe 41 by another pipe fitting.

In some embodiments of the present disclosure, as illustrated in FIG. 3, the upper end of the pipe joint 42 extends into the lower end of the inner pipe 41. The inner pipe 41 has a greater average inner diameter than the pipe joint 42. Therefore, the pipe joint 42 and the inner pipe 41 can be simply and effectively engaged with each other to form the exhaust channel 401. In addition, it is possible to simply and effectively ensure that the average inner diameter of the inner pipe 41 is greater than that of the pipe joint 42, thereby reducing a pressure difference of the compressed gas.

It should be understood that in a case where the inner pipe and the pipe joint are the integrated exhaust pipe, in order to ensure that the diameter of the through-opening defined on the housing assembly is not too large, the outer diameter of the pipe joint needs to be minimized, and thus the inner diameter of the pipe joint is reduced accordingly. However, according to the gas-liquid separation device 100 of the embodiments of the present disclosure, since the inner pipe 41 and the pipe joint 42 are the separate members, and the upper end of the pipe joint 42 is inserted into the lower end of the inner pipe 41, it is possible to simply and effectively ensure that the average inner diameter of the inner pipe 41 is greater than the average inner diameter of the pipe joint 42. That is, the inner diameter of a part of the exhaust pipe 4 located within the housing assembly 1 is larger, which can reduce the pressure difference of the compressed gas. Thus, the compressor may have a small pressure loss and a low oil content. In addition, the service life of the separation assembly 2 can be prolonged, and performance and efficiency of the compressor can be improved.

In some embodiments of the present disclosure, as illustrated in FIG. 3, a lug boss 411 is provided on the outer peripheral wall of the lower end of the inner pipe 41. A part of the inner pipe 41 located below the lug boss 411 is the bottom end portion 412, the bottom end portion 412 having an outer diameter tapering from top to bottom. The bottom end plate 3 is sleeved over the bottom end portion 412 by means of the center hole 302 and stopped at a position below the lug boss 411. Therefore, with a deformation of the bottom end portion 412, the bottom end plate 3 can be sleeved over the bottom end portion 412 from bottom to top relative to the inner pipe 41. Also, the stopping provided by the lug boss 411 can facilitate determining that the bottom end plate 3 is assembled in place and stopping and position-limiting of the bottom end plate 3, and improve mounting reliability of the bottom end plate 3. It should be noted that the manner by which the bottom end plate 3 is fixed to the inner pipe 41 is not limited. For example, the bottom end plate 3 may be welded to the inner pipe 41 to ensure fixation reliability.

In some embodiments of the present disclosure, as illustrated in FIG. 3, the upper end of the pipe joint 42 is inserted into the lower end of the inner pipe 41, and the inner diameter of the lower end of the inner pipe 41 is greater than the outer diameter of the upper end of the pipe joint 42. Therefore, the outer peripheral surface of the upper end of the pipe joint 42 is in a clearance fit with the inner peripheral surface of the lower end of the inner pipe 41. That is, the outer peripheral surface of the upper end of the pipe joint 42 is in no contact with the inner peripheral surface of the lower end of the inner pipe 41. Therefore, difficulty in the assembly between the pipe joint 42 and the inner pipe 41 can be reduced, thereby enabling the pipe joint 42 to be easily inserted into the lower end of the inner pipe 41.

In addition, for some gas-liquid separation devices in the related art, the inner pipe and the pipe joint are connected to each other by crimp-type connection. In this case, the oil discharge gap is reserved at the fitting position between the inner pipe and the pipe joint to allow the separated oil to be discharged by the oil discharge gap. Due to the arrangement of the oil discharge gap, assembly reliability between the inner pipe and the pipe joint is poor. In addition, the inner pipe needs to be pressed into the pipe joint by a special tool, thereby leading to complex mounting process, and causing an extra loss when the inner pipe is not pressed in place or the inner pipe is crushed during the pressing.

However, according to the gas-liquid separation device 100 of the embodiments of the present disclosure, it is possible to prevent the oil from being discharged at the assembly position of the inner pipe 41 and the pipe joint 42, which can improve structural reliability. In addition, since the outer peripheral surface of the upper end of the pipe joint 42 is in the clearance fit with the inner peripheral surface of the lower end of the inner pipe 41, difficulty in the assembly between the pipe joint 42 and the inner pipe 41 can be reduced, thereby enabling the pipe joint 42 to be easily inserted into the lower end of the inner pipe 41, and avoiding the extra loss caused when the inner pipe is not pressed in place or the inner pipe is crushed during the pressing.

As illustrated in FIG. 3, in some embodiments, at least one sealing groove 4110 is formed on at least one of the inner peripheral surface of the lower end of the inner pipe 41 and the outer peripheral surface of the upper end of the pipe joint 42, and the sealing groove 4110 is located at the insertion-engagement position between the inner pipe 41 and the pipe joint 42. Therefore, the sealing groove 4110 can be configured to form a labyrinth seal or configured for the arrangement of a sealing ring or the like. The sealing groove 4110 in a labyrinth form can provide throttling, minimize the exchange between pure air and the oil, and reduce the amount of the pure air flowing to the liquid discharge channel 402.

For example, in an example illustrated in FIG. 3, at least one sealing groove 4110 is defined on the inner peripheral surface of the lug boss 411. Therefore, the thickness of the lug boss 411 can be used to make the seal groove 4110 for forming the labyrinth seal or for the arrangement of the sealing ring. The sealing groove 4110 in a labyrinth form can provide throttling, minimize the exchange between pure air and the oil, and reduce the amount of the pure air flowing to the liquid discharge channel 402. Or, the sealing ring or the like may be arranged in a gap between the outer peripheral surface of the upper end of the pipe joint 42 and the inner peripheral surface of the lower end of the inner pipe 41, thereby avoiding leakage of the gas in the exhaust channel 401 into the flow diversion cavity 101 through an insertion-engagement gap between the inner pipe 41 and the pipe joint 42.

In some embodiments, as illustrated in FIG. 7 and FIG. 8, the gas-liquid separation device 100 further includes a second seal 5B. The second seal 5B is located at a higher level than the liquid through hole 311 and disposed between the outer wall 31 and the outer peripheral wall of the pipe joint 42, to isolate the insertion-engagement gap between the flow diversion cavity 101 with the inner pipe 41 and the pipe joint 42. Therefore, it is possible to prevent the liquid entering the flow diversion cavity 101 from overflowing into the insertion-engagement gap between the inner pipe 41 and the pipe joint 42, thereby avoiding the liquid from entering the exhaust channel 401 unexpectedly. Therefore, the reliability of the gas-liquid separation can be ensured.

In some embodiments, as illustrated in FIG. 3, the outer peripheral wall of the exhaust pipe 4 has a shoulder 4a. The shoulder 4a passes through the through-opening 122. The liquid discharge channel 402 extends in an up-down direction. The liquid discharge channel 402 has a lower end penetrating the shoulder 4a, and the upper end penetrating the shoulder 4a and extending into the flow diversion cavity 101 to form the inlet of the liquid discharge channel 402. Therefore, a simple structure is obtained, which facilitates manufacturing.

Of course, the present disclosure is not limited in this regard. For example, in other examples of the present disclosure, as illustrated in FIG. 7 and FIG. 8, the outer peripheral wall of the exhaust pipe 4 has a shoulder 4a. The shoulder 4a passes through the through-opening 122. The liquid discharge channel 402 extends in an up-down direction and has a lower end penetrating the shoulder 4a. A side opening 403 is formed on the side wall of the shoulder 4a and is in communication with the flow diversion cavity 101. The side opening 403 is also in communication with the liquid discharge channel 402 to serve as the inlet of the liquid discharge channel 402. Therefore, a same liquid discharge process as described above can be achieved.

In some embodiments, as illustrated in FIG. 7 and FIG. 8, the upper end of the liquid discharge channel 402 penetrates the shoulder 4a, and a sealing member 5C is disposed on the upper end of the liquid discharge channel 402. Therefore, it is possible to prevent the liquid entering the liquid discharge channel 402 from overflowing from the upper end of the liquid discharge channel 402, thereby ensuring the reliability of the gas-liquid separation. It should be noted that the sealing member 5C may be a sealing ring or a plug disposed at the upper end of the liquid discharge channel 402. In addition, the sealing member 5C may be disposed within the upper end of liquid discharge channel 402 or at a top of the upper end of liquid discharge channel 402.

For example, in examples illustrated in FIG. 7 and FIG. 8, in the case where the shoulder 4a is formed on the pipe joint 42 and the upper end of the pipe joint 42 is inserted into the lower end of the inner pipe 41, when the upper end of the liquid discharge channel 402 is inserted into the lower end of the inner pipe 41 (as illustrated in FIG. 7 and FIG. 8), it is possible to prevent the liquid in the liquid discharge channel 402 from overflowing into the exhaust channel 401 by the arrangement of the sealing member 5C, thereby ensuring the reliability of the gas-liquid separation.

In some embodiments of the present disclosure, external threads are formed on the outer peripheral wall of the pipe joint 42, and internal threads are formed on the through-opening 122. The pipe joint 42 and the through-opening 122 are threadedly engaged with each other by means of the external threads and the internal threads. Therefore, the pipe joint 42 can be easily and effectively assembled to or disassembled from the housing assembly 1. In other words, the body 102 can be easily assembled to or disassembled from the pipe joint 42, or the body 102 can be easily disassembled from the pipe joint 42.

In some embodiments of the present disclosure, as illustrated in FIG. 3, FIG. 7, and FIG. 8, the first seal 5A is located above the threaded engagement position. Therefore, it is possible to effectively prevent the liquid in the flow diversion cavity 101 from flowing to the threaded engagement position, thereby ensuring reliability of the threaded engagement and reducing the risk of liquid leakage.

In some embodiments of the present disclosure, as illustrated in FIG. 3, FIG. 7, and FIG. 8, a mounting bracket 32 is disposed on the outer wall 31. The seal (such as the first seal 5A as shown in FIG. 3 and the second seal 5B shown in illustrated in FIG. 7 and FIG. 8) arranged at the insertion position is mounted on the mounting bracket 32. Therefore, the seal can be pre-mounted on the mounting bracket 32 and then integrated into the body 102. In this way, when the gas-liquid separation device 100 needs to be used, it is only necessary to connect the pipe joint 42 to the body 102 without considering the assembly of the seal, which improves mounting efficiency during use and ensures the reliability of sealing.

In some embodiments of the present disclosure, as illustrated in FIG. 3, each of the through-opening 122, the liquid discharge channel 402, and the exhaust channel 401 extends in an up-down direction. The through-opening 122 is arranged around the liquid discharge channel 402. The liquid discharge channel 402 is arranged around the exhaust channel 401. Therefore, the gas-liquid separation device 100 has good structural compactness, and reasonable position layouts of individual channels, which can further shorten the exhaust path and the liquid discharge path. Therefore, operation efficiency of the gas-liquid separation device 100 can be improved. It should be noted that, the liquid discharge channel 402 may be an annular channel arranged around the exhaust channel 401. The liquid discharge channel 402 may further be formed by a plurality of sub-channels arranged around the exhaust channel 401. That is, the plurality of sub-channels is arranged at intervals along a circumferential direction of the exhaust channel 401.

In some embodiments of the present disclosure, as illustrated in FIG. 2 and FIG. 3, the housing assembly 1 includes a housing 11 and a bottom cover 12. The housing 11 has an open bottom. The bottom cover 12 is disposed at the bottom of the housing 11, and both the gas inlet 121 and the through-opening 122 are formed on the bottom cover 12. The separation assembly 2 is of a cylindrical shape and vertically arranged in the separation chamber 111. That is, the axis of the separation assembly 2 extends in an up-down direction. The gas-liquid separation device further includes a top end plate 6 and a pressing member 7. The top end plate 6 is disposed at the top of the separation assembly 2. The pressing member 7 is disposed between the top end plate 6 and the top wall of the housing 11 to provide a downward pressing force to the separation assembly 2. Therefore, the gas-liquid separation device 100 is simple in structure, which facilitates manufacturing and assembly.

It should be understood that the pressing member 7 is configured to compensate a tolerance to enable the separation assembly 2 to be tightly pressed between the top end plate 6 and the bottom end plate 3, thereby ensure that the gas-liquid mixture can radially pass through the separation assembly 2 through a peripheral outer edge of the separation assembly 2 to realize the gas-liquid separation. The separated gas can enter a middle tubular cavity of the separation assembly 2 to ensure the operation reliability of the separation assembly 2. For example, in some embodiments of the present disclosure, the pressing member 7 may be a spring or the like.

In addition, the gas-liquid separation device 100 may further include a damping ring 9 disposed between the bottom end plate 3 and the bottom cover 12 to better ensure the operation reliability of the separation assembly 2. In addition, in the example illustrated in FIG. 7, when no seal is disposed between the bottom end plate 3 and the bottom cover 12 of the housing assembly 1, the damping ring 9 can also be used to achieve a further sealing effect.

In addition, it should be noted that a specific structure of the separation assembly 2 is not limited. For example, in the example illustrated in FIG. 2, the separation assembly 2 may include a first-stage separation medium 21, a second-stage separation medium 22, and a support member 23 that are arranged from outside to inside in a radial direction of the separation assembly 2. The gas-liquid mixture is subject to a coarse filtration through the first-stage separation medium 21 and a fine filtration through the second-stage separation medium 22 sequentially to improve performance of the gas-liquid separation. The support member 23 may be of a cylindrical shape, and the vent hole is defined in the wall of the cylindrical support member 23 to support the first-stage separation medium 21 and the second-stage separation medium 22. In some examples, the first-stage separation medium 21 may be a filter paper for adsorbing particles, and the second-stage separation medium 22 may be a filter paper for adsorbing oil droplets. The gas-liquid mixture continuously passes through the filter paper. Oil of small particle size gradually gathers into oil of a large particle size, and then flows downwards.

In some embodiments of the present disclosure, as illustrated in FIG. 2 and FIG. 3 and in conjunction with FIG. 6, the gas-liquid separation device 100 further includes a first sealing ring 81 and a second sealing ring 82. An annular recess is defined on the bottom of the pipe joint 42. The first sealing ring 81 is engaged within the annular recess. The second sealing ring 82 is sealed between the body 102 and the valve seat 200. For example, the bottom of the housing assembly 1 may further have a sealing bracket for the arrangement of the second sealing ring 82. In use of the gas-liquid separation device 100, set the first sealing ring 81 at the annular recess at the bottom of the pipe joint 42, and then install the pipe joint 42 on the valve seat 200. Thereafter, screw the upper portion of the pipe joint 42 into the body 102 along the threads. The second sealing ring 82 is sandwiched between the valve seat 200 and the body 102, and arranged around the gas inlet 102 to prevent the oil-gas mixture from entering atmospheric environment.

In an example of the present disclosure, as illustrated in FIG. 2 and FIG. 3 and in conjunction with FIG. 6, the compressed oil-gas mixed gas enters the housing 11 through the gas inlet 121 on the bottom cover 12 and passes through the separation assembly 2. In this way, small oil droplets in the oil-gas mixture can gather into large oil droplets that are deposited downward by gravity. The separated oil slowly gathers in the liquid collection groove 303 of the bottom end plate 3. As the height of the gathered oil rises gradually, the oil enters the flow diversion cavity 101 through the liquid through hole 311 on the bottom end plate 3, and all of the oil in the flow diversion cavity 101 flows into the valve seat 200 from the liquid discharge channel 402 of the pipe joint 42, and finally returns to a compressor host. The first seal 5A, the second seal 5B, the sealing member 5C, and the like have the function of intercepting the oil, which make the oil be completely discharged at the liquid discharge channel 402 of the pipe joint 42. Pure air separated from the oil-gas mixed gas by the separation assembly 2 enters the inner pipe 41 arranged within the separation assembly 2, then enters the inside of the pipe joint 42, and subsequently enters the air cooler.

In the description of this specification, descriptions with reference to the terms "an embodiment", "some embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art can combine the different embodiments or examples and the features of the different embodiments or examples described in this specification without contradicting each other.

Although embodiments of the present disclosure have been illustrated and described, it is conceivable for those of ordinary skill in the art that various changes, modifications, replacements, and variations can be made to these embodiments without departing from the principles and spirit of the present disclosure.

What is claimed is:

1. A gas-liquid separation device, comprising:
a housing assembly, a separation chamber being defined in the housing assembly, the housing assembly having a gas inlet in communication with the separation chamber and the bottom of the housing assembly having a through-opening;
a separation assembly, the separation assembly being disposed in the separation chamber and used to perform gas-liquid separation on the gas-liquid mixture entering the separation chamber;

a bottom end plate being disposed in the separation chamber and located at the bottom of the separation assembly, the bottom end plate having a center hole at a center of the bottom end plate, and a liquid reservoir being defined by the bottom end plate and used to receive the liquid separated by the separation assembly; and an exhaust pipe, the exhaust pipe having an exhaust channel and a liquid discharge channel, the exhaust pipe passing through the through-opening to allow the gas separated by the separation assembly to flow through the exhaust channel, a flow diversion cavity formed between the exhaust pipe and the bottom end plate, the flow diversion cavity being in communication with an outlet of the liquid reservoir and an inlet of the liquid discharge channel to configure the gas-liquid separation device in such a manner that a liquid flowing out of the outlet of the liquid reservoir enters the flow diversion cavity, and a liquid flowing out of the flow diversion cavity directly enters the inlet of the liquid discharge channel, wherein the exhaust pipe comprises:

an inner pipe, the inner pipe being located within the housing assembly and having a lower end abutted against and fixedly connected to the center hole of the bottom plate; and a pipe joint, the pipe joint having a lower end located outside the housing assembly and an upper end extending into the housing assembly through the through-opening and engaged with the inner pipe, so that the exhaust channel is defined by the inner pipe and the pipe joint, the liquid discharge channel is formed on the pipe joint, the pipe joint is detachably connected to the housing assembly, the upper end of the pipe joint extends into the lower end of the inner pipe, and the lower end of the inner pipe has a greater inner diameter than the outer diameter of the upper end of the pipe joint.

2. The gas-liquid separation device according to claim 1, wherein:

both the inlet of the liquid discharge channel and the outlet of the liquid reservoir are located at a higher level than the upper end of thee through-opening, the flow diversion cavity is located above the through-opening, the gas-liquid separation device further comprising:

a first seal, the first seal located at a level lower than the outlet of the liquid reservoir and higher than the through-opening, the first seal being sandwiched between the bottom end plate and the exhaust pipe, or sandwiched between the housing assembly and the exhaust pipe, or sandwiched between the bottom end plate, the housing assembly, and the exhaust pipe, to isolate the flow diversion cavity from the through-opening.

3. The gas-liquid separation device according to claim 1, wherein:

a liquid collection groove is formed around the center hole on the bottom end plate, the liquid collection groove constitutes as at least part of the liquid reservoir, the liquid collection groove having an outer wall having a liquid through hole, the liquid through hole serving as the outlet of the liquid reservoir and being in communication with the flow diversion cavity, the exhaust pipe passes through the center hole, and the center hole is located at a higher level than the liquid through hole and abutted against the exhaust pipe.

4. The gas-liquid separation device according to claim 1, wherein:

a second seal, the second seal located at a higher level than the liquid through hole and disposed between the outer wall of the liquid collection groove and an outer peripheral wall of the pipe joint, to isolate an insertion-engagement gap between the flow diversion cavity with the inner pipe and the pipe joint, the inner pipe has a greater average inner diameter than the pipe joint.

5. The gas-liquid separation device according to claim 1, further comprising:

a lug boss, the lug boss is disposed on an outer peripheral wall of the lower end of the inner pipe, the part of the inner pipe located below the lug boss is a bottom end portion, an outer diameter of the bottom end portion tapers from top to bottom, and the bottom end plate is sleeved outside the bottom end portion by means of the center hole and blocked at a position below the lug boss.

6. The gas-liquid separation device according to claim 5, wherein:

an outer peripheral surface of the upper end of the pipe joint is in a clearance fit with an inner peripheral surface of the lower end of the inner pipe, and an inner peripheral surface of the lug boss has at least one sealing groove.

7. The gas-liquid separation device according to claim 1, wherein, at least one sealing groove is formed on at least one of an inner peripheral surface of the lower end of the inner pipe and an outer peripheral surface of the upper end of the pipe joint, the at least one sealing groove being located at an insertion-engagement position between the inner pipe and the pipe joint.

8. The gas-liquid separation device according to claim 1, wherein the inner pipe is welded to the bottom end plate.

9. The gas-liquid separation device according to claim 1, wherein:

an outer peripheral wall of the pipe joint has external threads, the through-opening has internal threads, and the pipe joint is threadedly engaged with the through-opening by the external threads and the internal threads.

10. The gas-liquid separation device according to claim 1, wherein:

an outer peripheral wall of the exhaust pipe has a shoulder passing through the through-opening, the liquid discharge channel extends in an up-down direction and the liquid discharge channel has a lower end penetrating the shoulder, and an upper end penetrating the shoulder and extending into the flow diversion cavity to form the inlet of the liquid discharge channel.

11. The gas-liquid separation device according to claim 1, wherein:

an outer peripheral wall of the exhaust pipe has a shoulder passing through the through-opening, the liquid discharge channel extends in an up-down direction and the liquid discharge channel has a lower end penetrating the shoulder, a side opening is formed on a side wall of the shoulder, the side opening extending into and being in communication with the flow diversion cavity, and the side opening also extending into and being in communication with the liquid discharge channel to serve as the inlet of the liquid discharge channel, an upper end of the liquid discharge channel penetrating the shoulder, and a sealing member being disposed at the upper end of the liquid discharge channel.

12. The gas-liquid separation device according to claim 1, wherein:
the flow diversion cavity is formed between the inner pipe, the pipe joint, and the bottom end plate, or between the pipe joint and the bottom end plate.

13. The gas-liquid separation device according to claim 1, wherein the housing assembly comprises:
a housing and a bottom cover, the housing having an open bottom and the bottom cover is disposed at the bottom of the housing, both the gas inlet and the through-opening being formed on the bottom cover, the separation assembly is of a cylindrical shape and vertically disposed in the separation chamber, and the gas-liquid separation device further comprises a top end plate and a pressing member, the top end plate is disposed at a top of the separation assembly and the pressing member is disposed between the top end plate and the top wall of the housing to provide a downward pressing force to the separation assembly, each of the through-opening, the liquid discharge channel, and the exhaust channel extends in an up-down direction, and the through-opening is arranged around the liquid discharge channel, and the liquid discharge channel is arranged around the exhaust channel.

14. A gas-liquid separation device, comprising:
a housing assembly, a separation chamber being defined in the housing assembly, the housing assembly having a gas inlet in communication with the separation chamber and the bottom of the housing assembly having a through-opening;
a separation assembly, the separation assembly being disposed in the separation chamber and used to perform gas-liquid separation on the gas-liquid mixture entering the separation chamber;
a bottom end plate being disposed in the separation chamber and located at the bottom of the separation assembly, a liquid reservoir being defined by the bottom end plate and used to receive the liquid separated by the separation assembly; and
an exhaust pipe, the exhaust pipe having an exhaust channel and a liquid discharge channel, the exhaust pipe passing through the through-opening to allow the gas separated by the separation assembly to flow through the exhaust channel, a flow diversion cavity formed between the exhaust pipe and the bottom end plate, the flow diversion cavity being in communication with an outlet of the liquid reservoir and an inlet of the liquid discharge channel to configure the gas-liquid separation device in such a manner that a liquid flowing out of the outlet of the liquid reservoir enters the flow diversion cavity, and a liquid flowing out of the flow diversion cavity directly enters the inlet of the liquid discharge channel, wherein:
the bottom end plate has a center hole at a center thereof;
a liquid collection groove is formed around the center hole on the bottom end plate, the liquid collection groove constitutes as at least part of the liquid reservoir, the liquid collection groove having an outer wall having a liquid through hole, the liquid through hole serving as the outlet of the liquid reservoir and being in communication with the flow diversion cavity, the exhaust pipe passes through the center hole, and the center hole is located at a higher level than the liquid through hole and abutted against the exhaust pipe.

* * * * *